(12) United States Patent
Rosengren et al.

(10) Patent No.: US 10,075,010 B2
(45) Date of Patent: Sep. 11, 2018

(54) TABLET CONNECTION SYSTEM

(71) Applicant: Faraday & Future Inc., Gardena, CA (US)

(72) Inventors: Blake Rosengren, Hermosa Beach, CA (US); William Alan Beverley, Lakewood, CA (US)

(73) Assignee: FARADAY & FUTURE INC., Gardena, CA (US)

( * ) Notice: Subject to any disclaimer, the term of this patent is extended or adjusted under 35 U.S.C. 154(b) by 129 days.

(21) Appl. No.: 15/085,457

(22) Filed: Mar. 30, 2016

(65) Prior Publication Data

US 2017/0288442 A1 Oct. 5, 2017

(51) Int. Cl.
| | | |
|---|---|---|
| *H02J 7/00* | (2006.01) | |
| *H02J 7/02* | (2016.01) | |
| *H04B 1/3883* | (2015.01) | |
| *H04B 1/3822* | (2015.01) | |

(52) U.S. Cl.
CPC .......... *H02J 7/025* (2013.01); *H02J 7/0044* (2013.01); *H04B 1/3822* (2013.01); *H04B 1/3883* (2013.01)

(58) Field of Classification Search
CPC .......... H02J 7/025; H02J 5/005; H02J 7/0027; B60K 35/00; B60K 2350/352; B60K 2350/106; B60K 2350/1004; B60R 11/0235; B60R 2001/1215
USPC .......................................... 320/108, 114–115
See application file for complete search history.

(56) References Cited

U.S. PATENT DOCUMENTS

| | | | | |
|---|---|---|---|---|
| 7,126,583 | B1 * | 10/2006 | Breed | B60K 35/00 345/158 |
| 7,597,393 | B1 * | 10/2009 | Tuccinardi | B60R 11/0211 297/188.04 |
| 9,732,784 | B2 * | 8/2017 | Clouser | F16B 47/003 |
| 2005/0023899 | A1 * | 2/2005 | Kitazawa | B60K 35/00 307/10.1 |
| 2005/0098593 | A1 * | 5/2005 | Schedivy | B60R 11/02 224/275 |
| 2006/0148574 | A1 * | 7/2006 | Vitito | B60K 35/00 463/46 |
| 2010/0007805 | A1 * | 1/2010 | Vitito | B60K 35/00 348/837 |
| 2016/0111911 | A1 * | 4/2016 | Iwabuchi | H02J 7/0044 320/108 |
| 2016/0161052 | A1 * | 6/2016 | Griggs | F16M 11/24 320/108 |

* cited by examiner

*Primary Examiner* — Nghia Doan
(74) *Attorney, Agent, or Firm* — Skyler R. Lund

(57) ABSTRACT

In one embodiment, the tablet connection system includes an attachment station configured to couple to a tablet, and a tablet attachment system configured to couple to the attachment station and the tablet. The attachment station includes a charging mechanism such that the attachment station is configured to charge the tablet and hold the tablet such that the tablet is positioned for viewing by a user. In one embodiment, the charging mechanism of the attachment station is configured to wirelessly charge the tablet that is coupled thereto. The tablet attachment system is configured to provide coupling between the tablet and the attachment station.

10 Claims, 8 Drawing Sheets

TABLET CONNECTION SYSTEM

FIELD OF THE DISCLOSURE

The disclosure relates generally to a tablet connection system, and more specifically to a connection system for attaching a tablet or other electronic device to a portion of an automobile.

BACKGROUND OF THE DISCLOSURE

The use of electronic devices is becoming increasing prevalent, and often it may be optimal to be able to interact with these devices without the need to physically hold onto them. One such example of a location in which a user would like hands-free access to an electronic device would be in an automobile or other vehicle.

In addition, using an electronic device in any type of vehicle could require the user to have accessible charging options for the device. It is difficult to charge such a device during use depending on the location of the user in the vehicle and the accessibility of typical sources of power, such as from outlets or other sources in the dashboard area of the vehicle.

The present disclosure allows for the hands-free use of a tablet or other electronic device while simultaneously charging the device.

SUMMARY OF THE DISCLOSURE

One aspect of the disclosure relates to a tablet connection system. In one embodiment, a tablet connection system includes an attachment station configured to couple to a tablet, and a tablet attachment system configured to couple to the attachment station and the tablet. The attachment station includes a charging mechanism such that the attachment station is configured to charge the tablet and hold the tablet such that the tablet is positioned for viewing by a user. In one embodiment, the charging mechanism of the attachment station is configured to wirelessly charge the tablet that is coupled thereto. The tablet attachment system is configured to provide coupling between the tablet and the attachment station.

In one embodiment, the attachment station includes a plurality of connection points to couple to the tablet attachment system. The connections points of the attachment station can bee in the form of magnetic connection points. The attachment station is positioned within a seat of an automobile such that the tablet can be viewed by the user while the user is seated within the automobile.

In another embodiment, the tablet attachment system includes a plurality of connection points to couple the tablet to the attachment station. The plurality of connection points of the tablet attachment system have a length based on a desired distance between the charging mechanism of the attachment station and a charging portion of the tablet to maximize the transmission of energy therebetween. In one exemplary embodiment, the tablet attachment system is in the form of a plurality of permanently attached connection points on the tablet. In another exemplary embodiment, the tablet attachment system is in the form of a case configured to couple to the tablet to allow the tablet to couple to the attachment station.

BRIEF DESCRIPTION OF THE DRAWINGS

The structure and function of the disclosure can be best understood from the description herein in conjunction with the accompanying figures. The figures are not necessarily to scale, emphasis instead generally being placed upon illustrative principles. The figures are to be considered illustrative in all aspects and are not intended to limit the disclosure, the scope of which is defined only by the claims.

DESCRIPTION OF A PREFERRED EMBODIMENT

Figure 1:
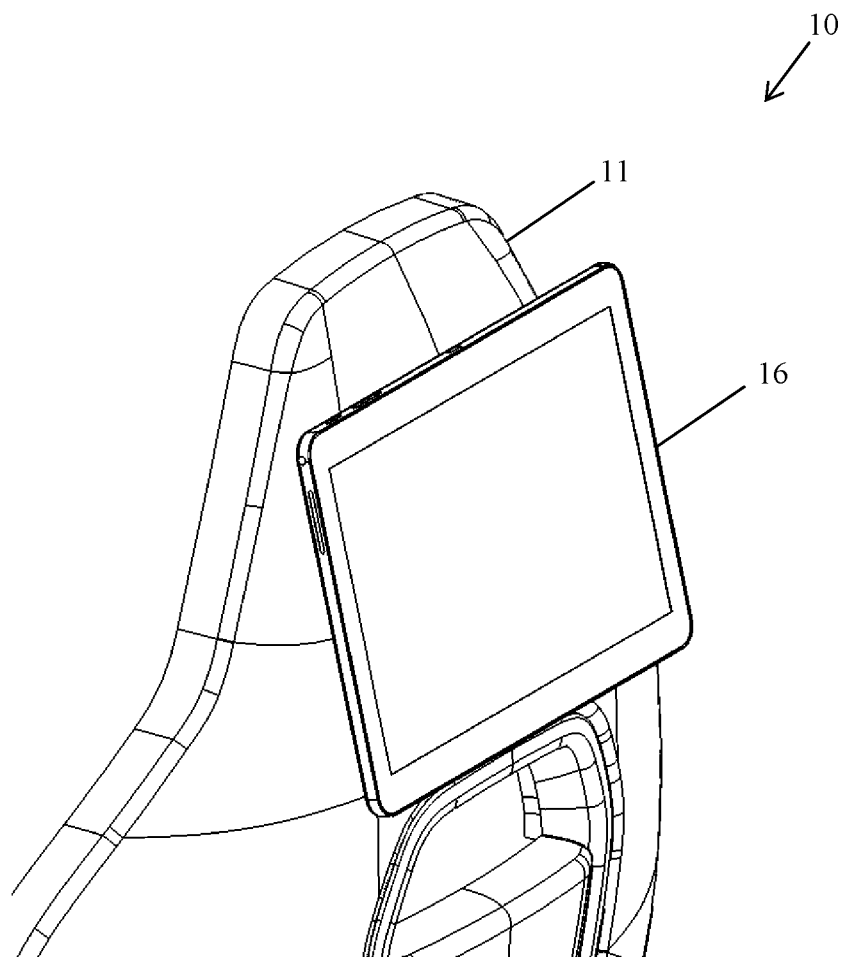
FIG. 1 is a perspective view of a tablet attached to a seat back by a connection system constructed in accordance with an embodiment of the disclosure.
Figure 2:
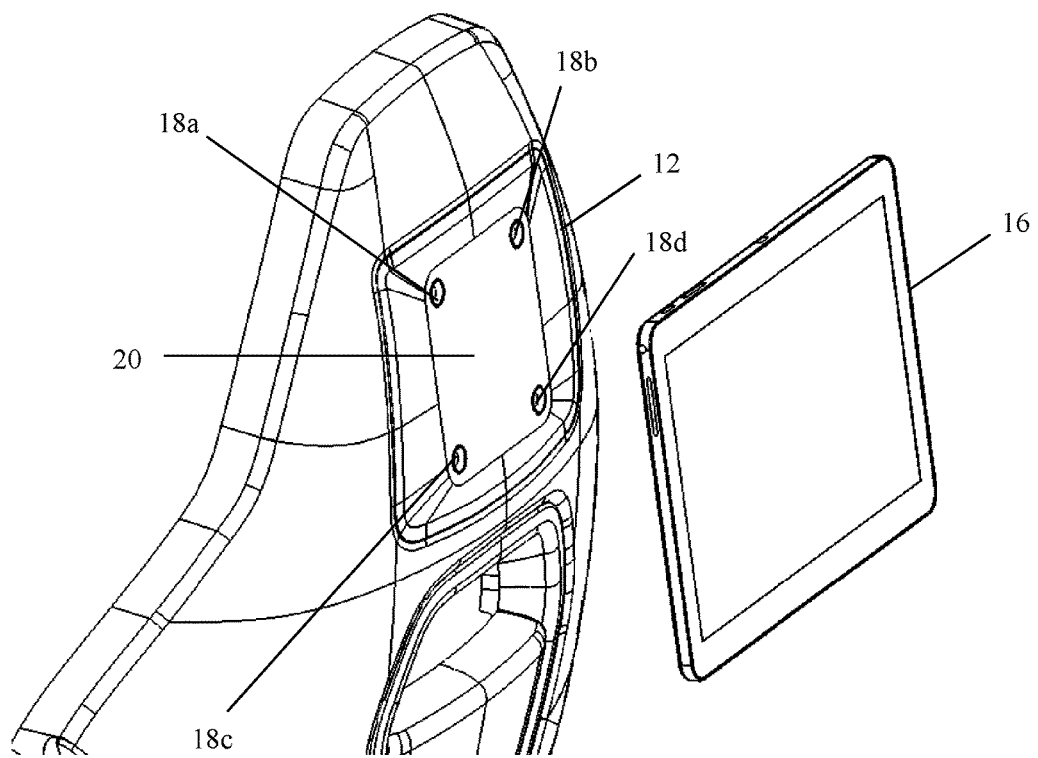
FIG. 2 is a perspective view of the tablet connection system of FIG. 1 with the tablet separated from the connection system.
Figure 3:
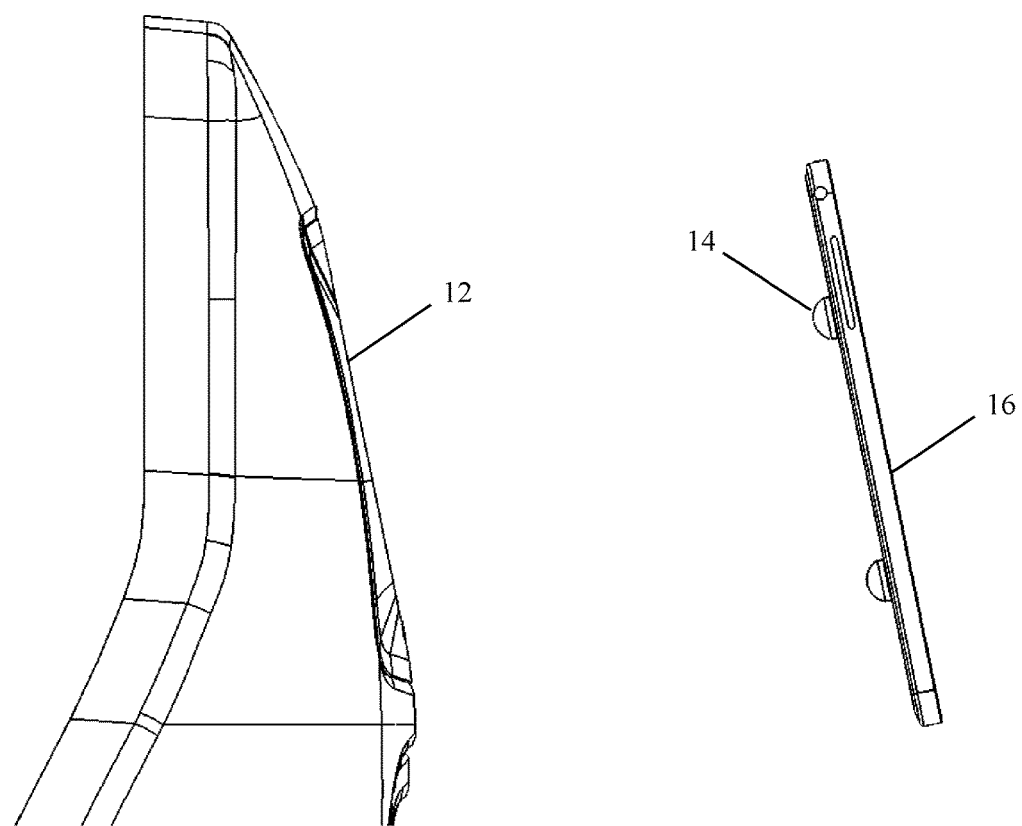
FIG. 3 is a side view of the tablet separated from the connection system of FIG. 2.

Referring to FIGS. 1-3, a tablet connection system 10 constructed in accordance with an embodiment of the disclosure includes an attachment station 12 (FIG. 2) shown attached to a seat back 11 of an automobile and a plurality of tablet mounting units 14. The attachment station 12 is configured to allow a tablet 16 to removably couple thereto such that the tablet 16 is held in place at a location for viewing by a user. In addition, the attachment station 12 can be configured to provide charging capabilities such that the tablet 16 can be charged while coupled to the attachment station 12. The tablet mounting units 14 are configured to removably couple to the tablet 16 and provide a mechanism by which the tablet 16 is coupled to the attachment station 12.

While the attachment station 12 can be used in a variety of applications to allow a user to view a display of a tablet, in one exemplary embodiment, the attachment station 12 as described herein is positioned in an automobile to allow to a user to view a tablet while seated therein. For example, as shown in FIGS. 1-3, the attachment station 12 is located within a seat back 11 of an automobile such that a user seated behind that seat back 11 can view the tablet 16 coupled thereto. It can be understood that the attachment station 12 can be located in any portion of an automobile where a tablet coupled thereto can be viewed by a user. It can also be understood that the attachment station 12 can be used to couple to a tablet for viewing by a user in any type of situation, including but not limited to any type of vehicle or a location within a building where a user could mount a tablet for viewing.

The attachment station 12, as shown in FIGS. 2-3, is configured to couple to the tablet 16 such that the tablet 16 can be viewed by a user without the user holding the tablet 16 in place. Various mechanisms can be used to couple the tablet 16 to the attachment station 12, but in the illustrated embodiment, the attachment station 12 includes a plurality of connection points that are used to couple a tablet thereto. As shown in FIG. 2, in one exemplary embodiment the attachment mechanism 12 can include four connection points 18a, 18b, 18c, 18d that are configured to couple to four corresponding connection points of the tablet attachment mechanism 14, as will be discussed in more detail below. The connection points 18a, 18b, 18c, 18d can be formed from a variety of mechanisms to achieve coupling to the tablet, but in the exemplary embodiment the connection points 18a, 18b, 18c, 18d are in the form of magnetic connection points that removably couple the tablet 16 thereto using the magnetic attraction between the connection points 18a, 18b, 18c, 18d and the corresponding connection points associated with the tablet attachment mechanism 14. Thus, the magnetic connection points 18a, 18b, 18c, 18d and the corresponding magnetic connection points associated with the tablet attachment mechanism 14 can be used to removably couple the tablet 16 to the attachment station 12.

Figure 5:
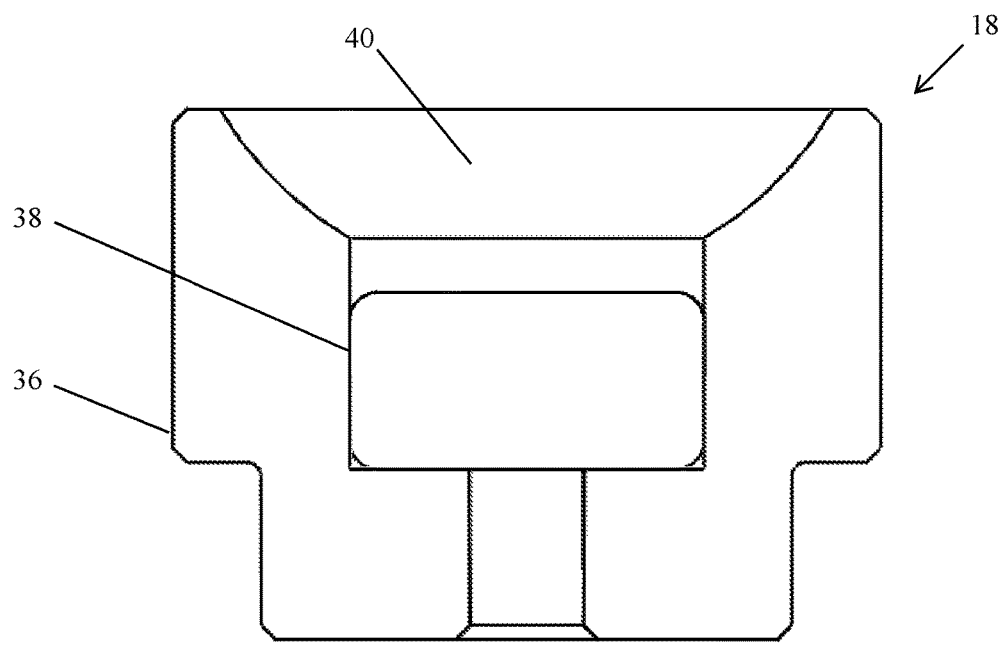
FIG. 5 is a cross-sectional view of one embodiment of a female connector of an attachment mechanism for use with a tablet connection system.
Figure 6:
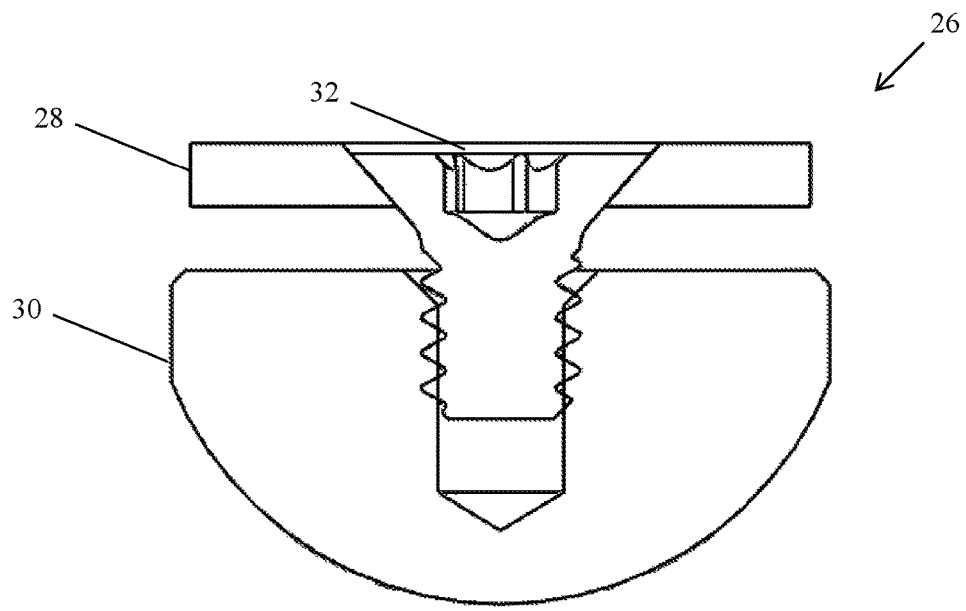
FIG. 6 is a cross-sectional view of one embodiment of a male connector of an attachment mechanism of a tablet connection system.

The connection points 18a, 18b, 18c, 18d can have any size, shape, and number necessary to achieve magnetic attraction to the corresponding magnetic connection points associated with the tablet such that there is enough magnetic force to hold the tablet in place until a user removes the tablet therefrom. In one exemplary embodiment illustrated in FIG. 5, the connection point 18 can include a substantially rectangular housing 36 having a magnetic element 38 positioned therein. The housing 36 also includes an opening 40 formed therein for receiving the corresponding connection point of the tablet attachment mechanism 14. The magnetic element 38 of the connection point 18 is positioned under the opening 40 such that the magnetic element 38 and the corresponding magnetic connection point of the tablet attachment mechanism 14 couples the tablet 16 to the attachment station 12. It can be understood that any mechanism can be used to form the connection points to allow for coupling with the corresponding connection points associated with the tablet, including but not limited to any male and female connectors or other attachment mechanism that would allow for removable coupling between the tablet 16 and the attachment station 12.

The attachment station 12 includes a charging mechanism 20 (FIG. 2) that is configured to provide wireless charging to the tablet 16 when the tablet 16 is coupled to the attachment station 12. The charging mechanism 20 can be any size and shape as long as the charging mechanism 20 is able to provide charging to the tablet 16. The charging mechanism 20 can also be positioned relative to the seat back and the connection points of the attachment station 12 in any way that allows for charging of the tablet 16, but in the exemplary embodiment shown in FIG. 2, the charging mechanism 20 is positioned within a central portion of the attachment station 12 and within the connection points 18a, 18b, 18c, 18d.

The charging mechanism 20 can have a variety of forms, but in one exemplary embodiment the charging mechanism is in the form of a charging coil mounted in the seat back. The charging coil can be powered by a variety of sources, including from a feeding coil coupled to the automobile battery. The charging coil associated with the charging mechanism 20 is configured to wirelessly transmit energy to a receiver coil associated with the battery of the tablet 16 such that the tablet 16 is wirelessly charged by the charging mechanism 20. Any wireless charging standard can be used by the charging mechanism 20, including the QI standard.

The attachment station 12 can be positioned within the automobile seat back in a variety of ways. In one embodiment, as shown in FIG. 2, the components of the attachment station 12 are visible and positioned within the surface of the seat of the automobile. As shown in FIG. 2, each connection point 18a, 18b, 18c, 18d can be formed within a divot in the seat material such that the connection point 18a, 18b, 18c, 18d is positioned within each of the divots. In another embodiment, the components of the attachment station 12 are configured to be mounted within the seat of the automobile so that the material of the seat is seamless with respect to the positioning of the attachment station 12.

The tablet attachment mechanism 14 is configured to removably couple to the tablet 16 and provides a mechanism by which the tablet 16 can be coupled to the attachment station 12. The tablet attachment mechanism 14 can have various configurations to allow removable coupling between the tablet 16 and the attachment station 12. While the connection points of the tablet attachment mechanism 14 can be formed from a variety of mechanisms to achieve coupling to the attachment station 12, in the exemplary embodiment the connection points are in the form of magnetic connection points that removably couple the tablet to the attachment station 12 and correspond to the magnetic connection points 18a, 18b, 18c, 18d of the attachment station 12.

Figure 4:
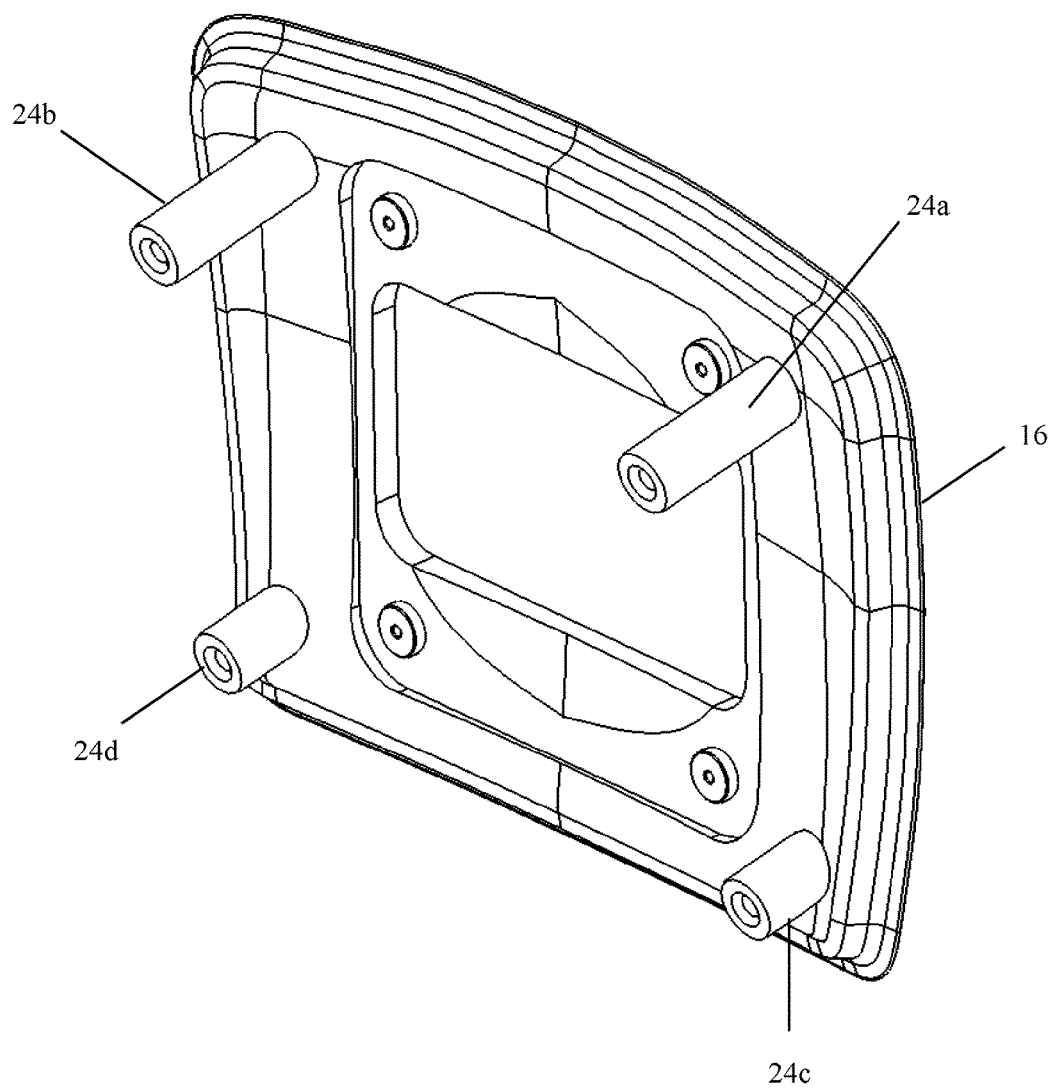
FIG. 4 is a perspective view of one embodiment of a tablet attachment mechanism for use with a tablet connection system.

As shown in FIG. 4, in one exemplary embodiment the tablet attachment mechanism 14 can be configured to couple to the four corresponding connection points 18a, 18b, 18c, 18d of the attachment station 12. The connection points 18a, 18b, 18c, 18d can include standoffs 24a, 24b, 24c, 24d that are in the form of elongate elements that include a magnetic component such that they can magnetically couple to the connection points of the tablet attachment mechanism 14. The length of the standoffs 24a, 24b, 24c, 24d can vary for a variety of reasons, including aesthetic ones. The length of the standoffs 24a, 24b, 24c, 24d can also be determined based on a desired distance between the charging coils of the charging mechanism 20 of the attachment station 12 and the charging coils in the tablet 16 to efficiently transmit energy therebetween. For example, the length of the standoffs 24a, 24b, 24c, 24d can range between ⅛ and ¼ of an inch.

Figure 7:
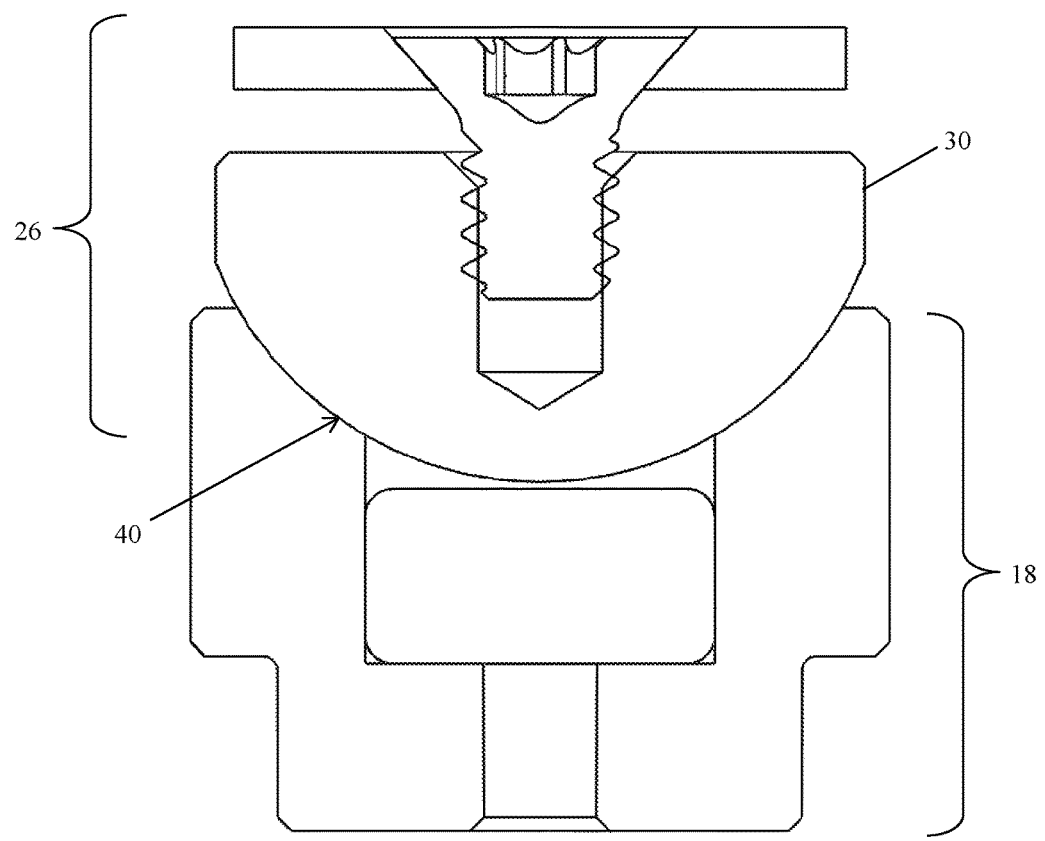
FIG. 7 is a cross-sectional view of the connectors of FIGS. 5-6 coupled to one another.
Figure 8:
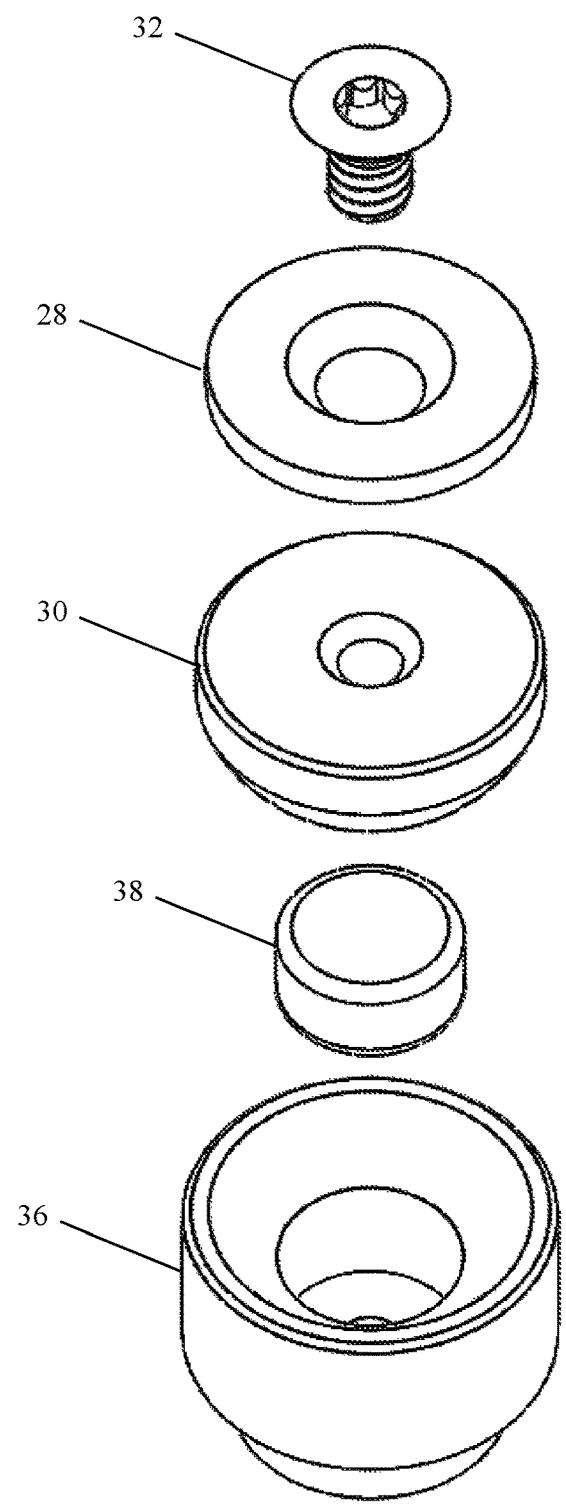
FIG. 8 is an exploded view of the connectors of FIGS. 5-6.
Figure 9:
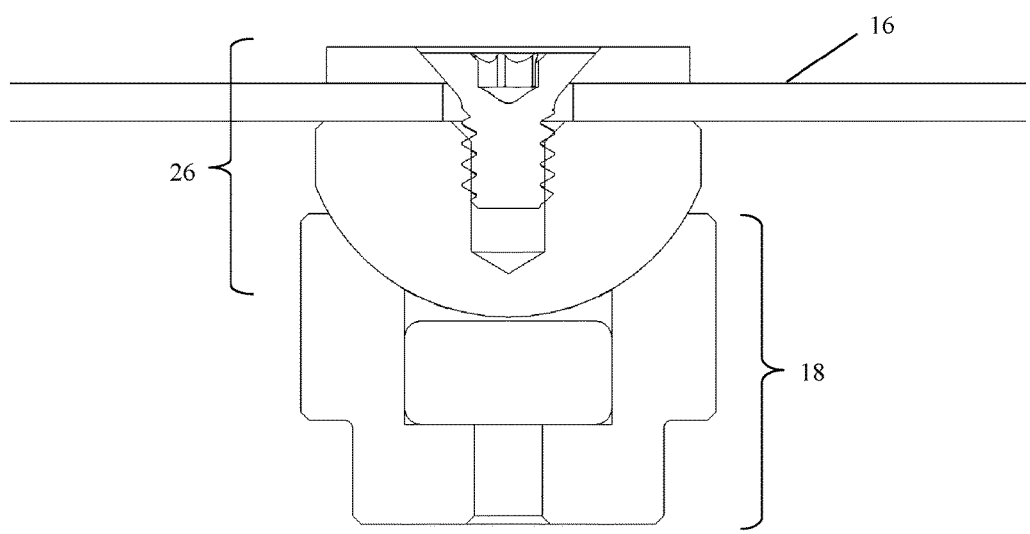
FIG. 9 is a cross-sectional view of the connectors of FIGS. 5-6 coupled to one another and having a tablet coupled thereto.

As shown in FIGS. 6-9, in another exemplary embodiment the tablet attachment mechanism 14 can include connection points 26 that are configured to couple to corresponding connection points 18 of the attachment station 12 and are in the form of clamping elements that are configured to clamp around the outside edges of a tablet. Each of the clamping elements includes a magnetic component such that they can magnetically couple to the connection points 18 of the attachment station 12. The connection points 26 of the tablet attachment mechanism 14 include a clamping surface 28 having an opening formed therein for receiving a screw 32. A magnetic element 30 includes an opening for receiving a distal end of the screw 32 such that the screw 32 passes through the clamping surface 28, a portion of a back cover of the tablet 16, and the magnetic element 30 to clamp a portion of the tablet therebetween. The magnetic element 30 is sized and shaped to be received by the opening 40 formed in the connection point 18 of the attachment station 12 to couple the tablet to the attachment station 12. FIG. 7 illustrates the connection points 26 of the tablet attachment mechanism 14 coupled to the connection points 18 of the attachment station 12 with the magnetic element 30 seated within the opening 40. Any number of the connection points 26 of the tablet attachment mechanism 14 can be used with a corresponding number of connection points 18 of the attachment station 12 to couple the tablet to the attachment station 12.

The tablet attachment mechanism 14 can have various configurations to couple to the tablet 16. In one embodiment, the tablet attachment mechanism 14 is in the form of permanent connection points that are attached to a back surface of a tablet and that are configured to couple to the connection points of the attachment station. It can be understood that the connection points can also be removably coupled to the back surface of the tablet. In another embodiment, the tablet attachment mechanism 14 is in the form of a case configured to couple to the tablet and provide a mechanism for coupling the tablet to the attachment station 12. It can be understood that any of the mechanisms or connection points described herein can be used with the case to couple the tablet to the attachment station 12.

Unless otherwise indicated, all numbers expressing lengths, widths, depths, or other dimensions, and so forth used in the specification and claims are to be understood in all instances as indicating both the exact values as shown and as being modified by the term "about." Accordingly, unless indicated to the contrary, the numerical parameters set forth in the specification and attached claims are approximations that may vary depending upon the desired properties sought to be obtained. At the very least, and not as an attempt to limit the application of the doctrine of equivalents to the scope of the claims, each numerical parameter should at least be construed in light of the number of reported significant digits and by applying ordinary rounding techniques. Any specific value may vary by 20%.

The terms "a," "an," "the," and similar referents used in the context of describing the disclosure (especially in the context of the following claims) are to be construed to cover both the singular and the plural, unless otherwise indicated herein or clearly contradicted by context. All methods described herein can be performed in any suitable order unless otherwise indicated herein or otherwise clearly contradicted by context. The use of any and all examples, or exemplary language (e.g., "such as") provided herein is intended merely to better illuminate the disclosure and does not pose a limitation on the scope of any claim. No language in the specification should be construed as indicating any non-claimed element essential to the practice of the disclosure.

Groupings of alternative elements or embodiments disclosed herein are not to be construed as limitations. Each group member may be referred to and claimed, individually or in any combination with other members of the group or other elements found herein. It is anticipated that one or more members of a group may be included in, or deleted from, a group for reasons of convenience and/or patentability. When any such inclusion or deletion occurs, the specification is deemed to contain the group as modified, thus fulfilling the written description of all Markush groups used in the appended claims.

Certain embodiments are described herein, including the best mode known to the inventor for carrying out the spirit of the present disclosure. Of course, variations on these described embodiments will become apparent to those of ordinary skill in the art upon reading the foregoing description. The inventor expects skilled artisans to employ such variations as appropriate, and the inventor intends for the disclosure to be practiced otherwise than specifically described herein. Accordingly, the claims include all modifications and equivalents of the subject matter recited in the claims as permitted by applicable law. Moreover, any combination of the above-described elements in all possible variations thereof is contemplated unless otherwise indicated herein or otherwise clearly contradicted by context.

In closing, it is to be understood that the embodiments disclosed herein are illustrative of the principles of the claims. Other modifications that may be employed are within the scope of the claims. Thus, by way of example, but not of limitation, alternative embodiments may be utilized in accordance with the teachings herein. Accordingly, the claims are not limited to embodiments precisely as shown and described.

What is claimed is:

1. A tablet connection system, comprising:
    a seat attachment station configured to be coupled to a vehicle seat, the seat attachment station including a plurality of seat-side connection points, each seat-side connection point comprising:
        a housing including
            a semispherical opening radially symmetrical an axis and having a first width and a first depth running along the axis from a top of the housing to a first point below the top,
            a cylindrical opening radially symmetrical the axis and having a second width smaller than the first width and a second depth running along the axis from the first point to a second point below the first point, and
        a seat-side magnetic element configured to fit within the second opening; and
    a tablet attachment station configured to be coupled to a tablet, the tablet attachment station including:
        a clamping surface configured to be directly coupled to the tablet and having a plurality of openings;
        a plurality of tablet-side connection points, each tablet-side connection point comprising:
            a tablet-side magnetic element including:
                a flat top side including a surface perpendicular to the axis and a having a threaded opening running along the axis partially through the tablet-side magnetic element, and
                a semispherical bottom side configured to at least partially fit within the semispherical opening of the seat-side connection point housing;
            a threaded fastener configured to run through an opening of the plurality of openings in the clamping surface and be threaded into the threaded opening in the tablet-side magnetic element, thereby coupling the clamping surface to the tablet-side magnetic element;
    wherein each of the plurality of seat-side connection points is configured to be magnetically coupled to a respective tablet-side connection point, thereby removably coupling the tablet to the vehicle seat.

2. The tablet connection system of claim 1 further comprising a wireless charging mechanism, including a seat-side charging mechanism and a tablet-side charging mechanism.

3. The tablet connection system of claim 2, wherein, when the tablet is removably coupled to the vehicle seat, the seat-side charging mechanism is separated from the tablet-side charging mechanism by a non-zero distance.

4. The tablet connection system of claim 2, wherein the tablet-side charging mechanism is disposed on the clamping surface within the boundaries of the tablet-side connection points.

5. The tablet connection system of claim 1, wherein the threaded fastener of each of the plurality of tablet-side connection points is a threaded screw.

6. The tablet connection system of claim 1, wherein the clamping surface is configured to clamp around the outside edges of a tablet.

7. The tablet connection system of claim 1, wherein the semispherical bottom side of the tablet-side magnetic element has a width greater than the semispherical opening of the housing.

8. The tablet connection system of claim 7, wherein the tablet-side magnetic element includes a cylindrical middle portion with a width equal to the width of the semispherical bottom side and a length connecting the flat top side surface with the semispherical bottom side.

9. The tablet connection system of claim 1, wherein the threaded fastener is further configured to run through an opening in a back surface of the tablet before running through the opening in the clamping surface.

10. The tablet connection system of claim 1, wherein:
the housing of each seat-side connection point further includes a second cylindrical opening having a having a third width smaller than the second width, and a third depth running from the second point to a bottom of the housing along the axis; and
each seat-side connection point further includes a seat-side fastener configured to fit within the second cylindrical opening and is configured couple the vehicle seat to the magnetic element, thereby coupling the housing to the vehicle seat.

* * * * *